(12) United States Patent
Truong et al.

(10) Patent No.: US 11,692,835 B2
(45) Date of Patent: *Jul. 4, 2023

(54) SYSTEMS AND METHODS FOR ROUTE MAPPING WITH FAMILIAR ROUTES

(71) Applicant: Capital One Services, LLC, McLean, VA (US)

(72) Inventors: Anh Truong, Champaign, IL (US); Vincent Pham, Champaign, IL (US); Jeremy Goodsitt, Champaign, IL (US); Austin Walters, Savoy, IL (US); Mark Watson, Sedona, AZ (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 5 days.

This patent is subject to a terminal disclaimer.

(21) Appl. No.: 17/009,577

(22) Filed: Sep. 1, 2020

(65) Prior Publication Data

US 2021/0088344 A1    Mar. 25, 2021

Related U.S. Application Data

(63) Continuation of application No. 16/512,673, filed on Jul. 16, 2019, now Pat. No. 10,794,715.

(51) Int. Cl.
*G01C 21/34* (2006.01)
*G01C 21/36* (2006.01)

(52) U.S. Cl.
CPC ..... *G01C 21/3446* (2013.01); *G01C 21/3415* (2013.01); *G01C 21/3484* (2013.01); *G01C 21/3667* (2013.01)

(58) Field of Classification Search
CPC ............ G01C 21/3446; G01C 21/3415; G01C 21/3484; G01C 21/3667
See application file for complete search history.

(56) References Cited

U.S. PATENT DOCUMENTS

| 5,528,501 | A  | 6/1996  | Hanson           |
|-----------|----|---------|------------------|
| 6,662,105 | B1 | 12/2003 | Tada et al.      |
| 8,798,918 | B2 | 8/2014  | Onishi et al.    |
| 8,958,984 | B2 | 2/2015  | Okude et al.     |
| 9,423,262 | B2 | 8/2016  | Nesbitt          |
| 9,476,727 | B2 | 10/2016 | Ziezold et al.   |
| 9,488,490 | B2 | 11/2016 | Chintakindi et al. |
| 9,784,588 | B2 | 10/2017 | Wang             |

(Continued)

OTHER PUBLICATIONS

Chang et al.; Discovering Personalized Routes from Trajectories; Proc. of the 3rd ACM SIGSPATIAL Intl. Workshop on Location-Based Social Networks; 2011; pp. 33-40 (Year: 2011).*

(Continued)

*Primary Examiner* — Michael J Zanelli
(74) *Attorney, Agent, or Firm* — Hunton Andrews Kurth LLP

(57) ABSTRACT

Systems and methods for route mapping with familiar routes include striking a balance between optimal routes from standard navigation systems minimizing time and distance and a mapping component that suggests familiar routes based on a user's route history. New routes including one or more familiar routes may be suggested to the user when they are not too far out of the way or take too long compared to the optimal routes and when they may be preferable or more comfortable.

20 Claims, 4 Drawing Sheets

(56) References Cited

U.S. PATENT DOCUMENTS

| | | |
|---|---|---|
| 2005/0071078 A1 | 3/2005 | Yamada et al. |
| 2007/0244637 A1 | 10/2007 | Singh |
| 2008/0004803 A1 | 1/2008 | Kikuchi |
| 2008/0103686 A1 | 5/2008 | Alberth et al. |
| 2009/0157306 A1 | 6/2009 | Mitsugi |
| 2009/0234574 A1 | 9/2009 | Deng et al. |
| 2009/0287407 A1 | 11/2009 | Sheha et al. |
| 2010/0076674 A1 | 3/2010 | Berot et al. |
| 2010/0076677 A1 | 3/2010 | Bussmann et al. |
| 2010/0088025 A1 | 4/2010 | Garg et al. |
| 2010/0205060 A1 | 8/2010 | Athsani et al. |
| 2011/0301832 A1 | 12/2011 | Zheng et al. |
| 2012/0209509 A1 | 8/2012 | Kodan et al. |
| 2013/0103311 A1 | 4/2013 | Yanase |
| 2013/0325320 A1 | 12/2013 | Dimitriadis |
| 2013/0345977 A1 | 12/2013 | Shimizu et al. |
| 2014/0330509 A1 | 11/2014 | Mutoh |
| 2015/0168147 A1 | 6/2015 | Duleba |
| 2015/0377640 A1 | 12/2015 | Healey et al. |
| 2016/0054135 A1 | 2/2016 | Fowe |
| 2016/0076896 A1 | 3/2016 | Konig et al. |
| 2017/0023374 A1 | 1/2017 | Poppen et al. |
| 2017/0276502 A1 | 9/2017 | Fischer et al. |
| 2018/0066952 A1 | 3/2018 | Bansal et al. |
| 2019/0226864 A1 | 7/2019 | Miyazaki et al. |
| 2019/0301880 A1* | 10/2019 | Werner ............. G01C 21/3415 |

OTHER PUBLICATIONS

Notification Concerning Transmittal of International Preliminary Report on Patentability from related Application No. PCT/US2020/041763 dated Jan. 27, 2022.

Notification of Transmittal of the International Search Report and the Written Opinion of the International Searching Authority issued in PCT/US2020/041763, dated Oct. 1, 2020.

European Examination Report issued in related European Application No. EP 20 753 521.2 dated Apr. 18, 2023, 6 pages.

* cited by examiner

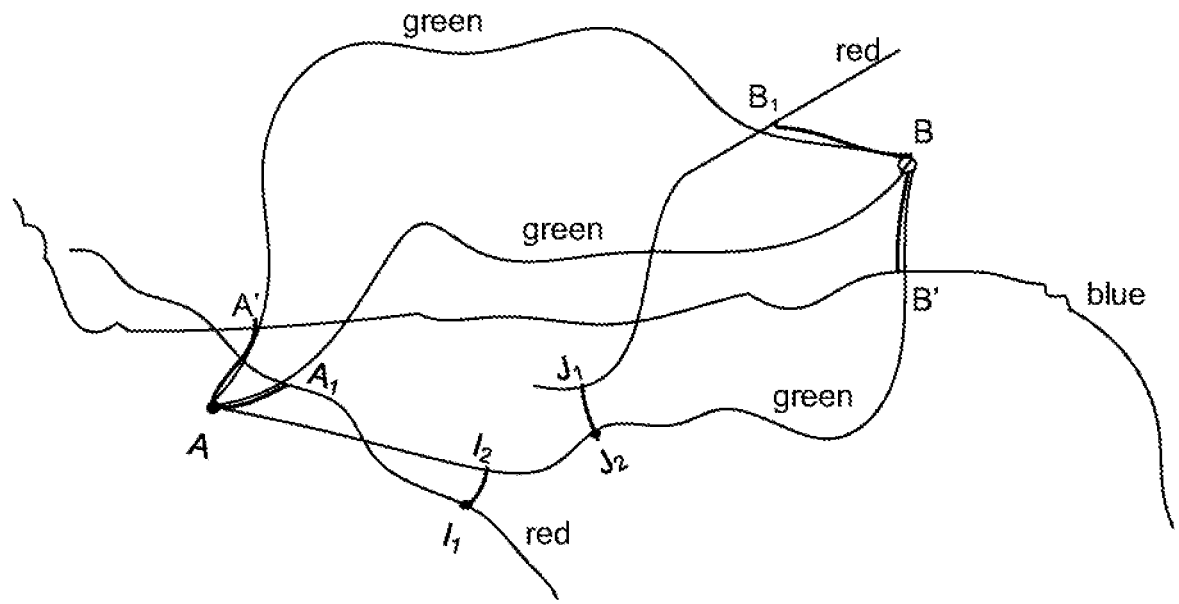

3 Possible Optimal Routes AB (green)
3 Familiar Routes A'B' (blue), $A_1I_1$ (red), $J_1B_1$ (red)

Simple New Route AA'B'B
A = origination selection
B = destination selection
A'B' = familiar route segment (blue)
A' = familiar origination
B' = familiar destination
AA' = origination route (dashed)
B'B = destination route (dashed)

Combination New Route $AA_1I_1I_2J_2J_1B_1B$
$A_1I_1$ = first familiar route segment (red)
$J_1B_1$ = second familiar route segment (red)
$I_1I_2$ = first connector route (dashed)
$I_2J_2$ = second connector route (green)
$J_2J_1$ = third connector route (dashed)
$AA_1$ = modified origination route (dashed)
$B_1B$ = modified destination route (dashed)

FIG. 4

SYSTEMS AND METHODS FOR ROUTE MAPPING WITH FAMILIAR ROUTES

CROSS-REFERENCE TO RELATED APPLICATION

This application is a continuation of U.S. patent application Ser. No. 16/512,673 filed Jul. 16, 2019, the complete disclosure of which is incorporated herein by reference in its entirety.

FIELD OF THE INVENTION

The present disclosure generally relates to route mapping or route planning and, in particular, to systems and methods for route mapping with familiar routes.

BACKGROUND

Currently, route mapping, planning or navigation systems provide optimal routes based on minimizing time or distance. These so-called optimal routes are sometimes very hard and confusing for users to follow. Inconvenient routes, although optimal in terms of time or distance, may involve small roads or a lot of turns. So-called optimal routes may cause unnecessary trouble. They may even add time when the user must take extra time to understand and follow directions. They may even add distance when it takes too long to change lanes and or somehow turns are missed and you have to recalculate. Inconvenient routes may be particularly difficult for young drivers, inexperienced drivers, elderly drivers, or disabled drivers.

There is a need for an alternative to the traditional so-called optimal routes that finds easier, more enjoyable and more comfortable routes. Such routes are familiar routes that the user has travelled previously, and where the user has local knowledge and personal preferences about the best ways to go. When a user is familiar with a route, even if it is five minutes slower or a little longer than the so-called optimal route, they may be able to travel the familiar route in about the same amount of time but without the issues or obstacles they might face with an unfamiliar route.

SUMMARY

The disclosed subject matter is directed to systems and methods for route mapping with familiar routes that satisfy these needs.

One embodiment of the present disclosure may be a route mapping system, comprising a server and a navigation application. The server may include a processor in data communication with a memory. The navigation application may be stored in the memory. The navigation application may comprise a route recorder and a mapping component.

Upon execution by the processor, the route recorder may collect route history data associated with a user. The route history data may include origin information, destination information, and location information regarding one or more routes taken by the user. The route reorder may store the route history data in a route history database.

Upon execution by the processor, the mapping component may receive an origination selection and a destination selection from the user. The mapping component may generate an optimal route from the origination selection to the destination selection. The mapping component may select a familiar route from the route history data based on the optimal route, where the familiar route has a familiar origination and a familiar destination. The mapping component may generate an origination route from the familiar origination to the origination selection. The mapping component may generate a destination route from the familiar destination to the destination selection. The mapping component may generate a new route from the origination selection to the destination selection, where the new route comprises the origination route, the familiar route, and the destination route. The mapping component may generate comparison information between the new route and the optimal route. The mapping component may communicate, for display on a user device associated with the user, the optimal route, the new route, and the comparison information.

The comparison information may include a comparison of an estimated travel time for the optimal route and an estimated travel time for the new route. The comparison information may include a notification to the user if the estimated travel time for the new route exceeds the estimated travel time for the optimal route by a predetermined threshold. The comparison information may include a comparison of an estimated travel distance for the optimal route and an estimated travel distance for the new route. The comparison information may include a notification to the user if the estimated travel distance for the new route exceeds the estimated travel distance for the optimal route by a predetermined threshold.

The familiar route may comprise a first familiar route segment and a second familiar route segment.

The mapping component may generate a first connector route, a second connector route and a third connector route. The first connector route connects the first familiar route segment to the second connector route. The second connector route connects the first connector route to the third connector route. The third connector route connects the second connector route to the second familiar route segment. The new route may comprise the first familiar route segment to the first connector route to the second connector route to the third connector route to the second familiar route segment.

The route recorder may store location information and time information at a number of points along one or more routes in the route history data. The route recorder may generate a weight for one or more routes in the route history data. The weight may represent a travel cost derived from location information and time information. The mapping component may minimize the travel cost.

One embodiment of the present disclosure may be a route mapping method. Route history data associated with a user may be collected. The route history data may include origin information, destination information, and location information regarding one or more routes taken by the user. The route history data may be stored in a route history database. An origination selection and a destination selection may be received from the user. An optimal route from the origination selection to the destination selection may be generated. A familiar route from the route history data may be selected based on the optimal route. The familiar route may have a familiar origination and a familiar destination. An origination route from the familiar origination to the origination selection may be generated. A destination route from the familiar destination to the destination selection may be generated. A new route from the origination selection to the destination selection may be generated. The new route may comprise the origination route, the familiar route, and the destination route. Comparison information between the new route and the optimal route may be generated. The comparison information may include an estimated travel time difference between the optimal route and the new route, and an estimated travel distance difference between the optimal route and the new route. The optimal route may be communicated for display on a user device associated with the user. When the estimated travel time difference does not exceed a travel time threshold and/or the estimated travel distance difference does not exceed a travel distance threshold, the new route and the comparison information may be communicated for display on the user device.

The route mapping method may comprise receiving the travel time threshold and/or the travel distance threshold from the user. The route mapping method may comprise determining the travel time threshold and/or the travel distance threshold from route history data. The familiar route may comprise a first familiar route segment and a second familiar segment route. The route mapping method may comprise generating a first connector route, a second connector route, and a third connector route, where the first connector route connects the first familiar route segment to the second connector route, the second connector route connects the first connector route to the third connector route, and the third connector route connects the second connector route to the second familiar route segment. The new route may comprise the first familiar route segment to the first connector route to the second connector route to the third connector route to the second familiar route segment. The route mapping method may comprise generating a modified origination route and a modified destination route, where the modified origination route connects the origination selection to the first familiar route and the modified destination route connects the second familiar route to the destination selection, and the new route includes the modified origination route and the modified destination route.

One embodiment of the present disclosure may be a route mapping application. The route mapping application may comprise a route recorder, a route history database, a mapping component and a communication component. The route recorder may collect route history data associated with a user. The route history data may include origin information, destination information, and location information regarding one or more routes taken by the user. The route history database may store the route history data collected by the route recorder.

The mapping component may receive an origination selection and a destination selection from the user. The mapping component may generate an optimal route from the origination selection to the destination selection. The mapping component may select a familiar route from the route history data based on the optimal route, where the familiar route has a familiar origination and a familiar destination. The mapping component may generate an origination route from the familiar origination to the origination selection. The mapping component may generate a destination route from the familiar destination to the destination selection. The mapping component may generate a new route from the origination selection to the destination selection, where the new route comprises the origination route, the familiar route, and the destination route. The mapping component may generate comparison information between the new route and the optimal route. The communication component may communicates, for display on a user device associated with the user, the optimal route, the new route, and the comparison information. The familiar route may comprise a first familiar route and a second familiar route.

The mapping component may generate a first connector route, a second connector route, and a third connector route. The first connector route connects the first familiar route to the second connector route. The second connector route connects the first connector route to the third connector route. The third connector route connects the second connector route to the second familiar route. The new route may comprise the first familiar route to the first connector route to the second connector route to the third connector route to the second familiar route.

The mapping component may generate a modified origination route and a modified destination route. The modified origination route connects the origination selection to the first familiar route and the modified destination route connects the second familiar route to the destination selection. The new route includes the modified origination route and the modified destination route.

The comparison information may include a comparison of an estimated travel distance for the optimal route and an estimated travel distance for the new route The comparison information may include a notification to the user if the estimated travel distance for the new route exceeds the estimated travel distance for the optimal route by a predetermined threshold.

These and other features, aspects and advantages of the disclosed subject matter are explained in greater detail with reference to specific example embodiments that are illustrated in the following description, appended claims, and accompanying drawings, in which like elements are indicated with like reference designators.

BRIEF DESCRIPTION OF THE DRAWINGS

FIG. 4 is a map, according to an example embodiment.

DETAILED DESCRIPTION OF EXAMPLE EMBODIMENTS

The following description of embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

Figure 1:
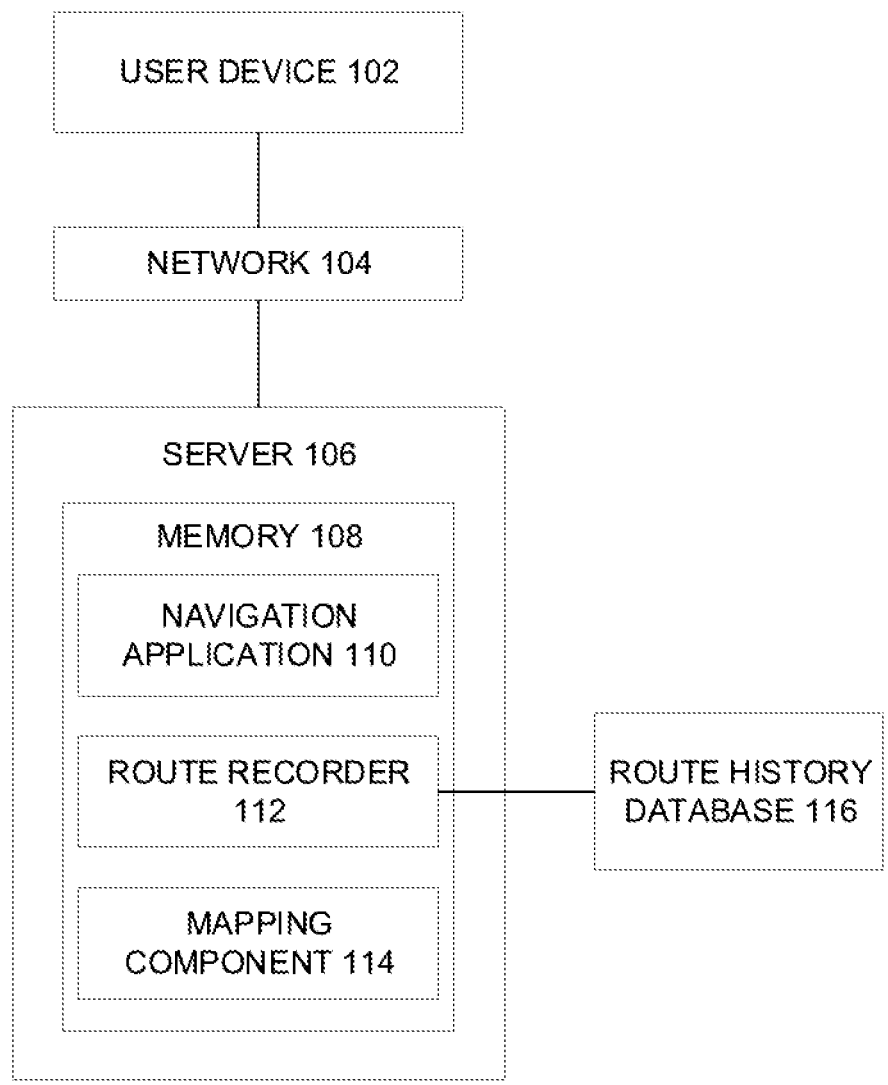
FIG. 1 is a diagram of a route mapping system, according to an example embodiment.

FIG. 1 is a diagram of a route mapping system 100, according to an example embodiment. Route mapping system 100 may include a user device 102 connected by a network 104 to a server 106.

User device 102 may be a network-enabled computer. As referred to herein, a network-enabled computer may include, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, or other device. The one or more network-enabled computers may execute one or more software applications to enable, for example, network communications. A mobile device may include an iPhone, iPod, iPad from Apple® or any other mobile device running Apple's iOS operating system, any device running Google's Android® operating system, including for example, Google's wearable device, Google Glass, any device running Microsoft's Windows® Mobile operating system, and/or any other smartphone or any wearable mobile device.

Network 104 may be one or more of a wireless network, a wired network, or any combination of a wireless network and a wired network. For example, network 104 may include one or more of a fiber optics network, a passive optical network, a cable network, an Internet network, a satellite network, a wireless LAN, a Global System for Mobile Communication (GSM), a Personal Communication Service (PCS), a Personal Area Networks, (PAN), D-AMPS, Wi-Fi, Fixed Wireless Data, IEEE 802.11b, 802.15.1, 802.11n, and 802.11g or any other wired or wireless network for transmitting and receiving a data signal.

In addition, network 104 may include, without limitation, telephone lines, fiber optics, IEEE Ethernet 902.3, a wide area network (WAN), a local area network (LAN) or a global network such as the Internet. Also, network 104 may support an Internet network, a wireless communication network, a cellular network, or the like, or any combination thereof. Network 104 may further include one network, or any number of example types of networks mentioned above, operating as a stand-alone network or in cooperation with each other. Network 104 may utilize one or more protocols of one or more network elements to which they are communicatively couples. Network 104 may translate to or from other protocols to one or more protocols of network devices. Although network 104 is depicted as a single network, it should be appreciated that according to one or more embodiments, network 104 may comprise a plurality of interconnected networks, such as, for example, the Internet, a service provider's network, a cable television network, corporate networks, and home networks.

Server 106 may be a network-enabled computer comprising a memory 108. Memory 108 may include random access memory (RAM), dynamic RAM (DRAM), static RAM (SRAM), read-only memory (ROM) or any other type of internal, external, primary and/or secondary memory or storage device, such as hard disk drive (HDD), compact disk (CD) or universal serial bus (USB) flash drive, or database. Memory 108 may include route history database 116. Memory 108 may store software for execution by a processor in server 106.

Memory 108 may comprise a navigation application 110, a route recorder 112, and a mapping component 114. Navigation application 110 may generate one or more optimal routes given a source and destination address. Navigation application 110 may be any application that provides navigational directions in real time, such as Waze®, Apple Maps®, or Google Maps®. Navigation application 110, route recorder 112, and mapping component 114 may use the Global Positioning System (GPS) radio navigation system.

Global Positioning System (GPS) is a worldwide radio-navigation system formed from the constellation of 24 satellites and their ground stations. The Global Positioning System is mainly funded and controlled by the U.S Department of Defense (DOD). The system was initially designed for the operation of U. S. military. But today, there are also many civil users of GPS across the whole world. The civil users are allowed to use the Standard Positioning Service without any kind of charge or restrictions.

Route recorder 112 may be any kind of GPS tracking system. GPS tracking may be any system or method of determining the location and/or movements of a thing. A GPS tracking system, for example, may be placed in a vehicle, on a cell phone, or on special GPS devices, which can either be a fixed or portable unit. GPS systems and methods may provide accurate location information. GPS tracking may track the movement of a vehicle or person. So, for example, a GPS tracking system may be used by a company to monitor the route and progress of a delivery truck, by parents to check on the location of their child, or to monitor high-valued assets in transit.

A GPS tracking system may use the Global Navigation Satellite System (GNSS) network. GNSS may incorporate a range of satellites that use microwave signals that are transmitted to GPS devices to give information on location, vehicle speed, time and direction. So, a GPS tracking system can potentially give both real-time and historic navigation data on any kind of journey.

GPS may provide special satellite signals, which are processed by a receiver. These GPS receivers not only track the exact location but can also compute velocity and time. The positions can even be computed in three-dimensional views with the help of four GPS satellite signals. The Space Segment of the GPS may include 27 Earth-orbiting GPS satellites. There may be 24 operational and 3 extra (in case one fails) satellites that move round the Earth each 12 hours and send radio signals from space that are received by the GPS receiver.

The control of the Positioning System may include different tracking stations that are located across the globe. These monitoring stations may help in tracking signals from the GPS satellites that are continuously orbiting the earth. Space vehicles transmit microwave carrier signals. The users of Global Positioning Systems have GPS receivers that convert these satellite signals so that one can estimate the actual position, velocity and time.

The operation of the system is based on a simple mathematical principle called trilateration. Trilateration falls into two categories: 2-D Trilateration and 3-D Trilateration. In order to make the simple mathematical calculation the GPS receiver must know two things. First it must know the location of the place is to be traced by at least three satellites above the place. Second, it must know the distance between the place and each of those Space Vehicles. Units that have multiple receivers that pick up signals from several GPS satellites at a same time. These radio waves are electromagnetic energy that travels at the speed of light.

A GPS tracking system can work in various ways. From a commercial perspective, GPS devices are generally used to record the position of vehicles as they make their journeys. Some systems may store the data within the GPS tracking system itself (known as passive tracking) and some send the information to a centralized database or system via a modem within the GPS system unit on a regular basis (known as active tracking) or 2-Way GPS.

A passive GPS tracking system may monitor location and store its data on journeys based on certain types of events. So, for example, a passive GPS system may log data such as where the device has traveled in the past 12 hours. The data stored on this kind of GPS tracking system is usually stored in internal memory or on a memory card, which can then be downloaded to a computer at a later date for analysis. In some cases the data can be sent automatically for wireless download at predetermined points/times or can be requested at specific points during the journey.

An active GPS tracking system is also known as a real-time system as this method may automatically send the information on the GPS system to a central tracking portal or system in real-time as it happens. This kind of system is usually a better option for commercial purposes such as fleet tracking or monitoring of people, such as children or elderly, as it allows a caregiver to know exactly where loved ones are, whether they are on time and whether they are where they are supposed to be during a journey. This is also a useful way of monitoring the behavior of employees as they carry out their work and of streamlining internal processes and procedures for delivery fleets.

Route recorder 112 collects historical data about users, such as daily home-to-work, home-to-shopping routes based on the location of user device 102 and/or GPS search. Route recorder 112 may store information in route history database 116. Route history database 116 may be any organized collection of data accessible on server 106 and may be any type of database, such as a relational database management system (RDBMS) using structured query language (SQL). Route history database 116 may be stored in memory 108 or in a separate memory or storage device accessible by server 106.

Navigation application 110 may be any application that provides navigational directions in real time, such as Waze®, Apple Maps®, or Google Maps®. Navigation application 110 may generate one or more optimal routes, given a source and destination address. Mapping component 114 may select one or more familiar routes that are close to but not the same as the optimal routes generated by navigation application 110. Then, mapping component 114 may add any transitional segments as needed to incorporate the familiar routes into a new route. The new route from the given source and destination may combine portions of familiar routes and portions of optimal routes. If the total time of the new route is greater than a threshold, (for example, 5-10 minutes for a short distance or 15-30 minutes for a long distance), then mapping component 114 may notify the user as to whether to choose that option or not.

User device 102 may include a navigation app that interacts with navigation application 110 on server 106. For example, user device 102 may be a smartphone including GPS navigation software app Waze® and server 106 may be a Waze® server. Waze® provides turn-by-turn navigation information and user-submitted travel times and route details while downloading location-dependent information over a mobile telephone network. Waze® collects map data, travel times and traffic information from users and transmits it to the Waze® server. Waze® users can report accidents, traffic jams, speed and police traps, and from the online map editor, can update roads, landmarks, house numbers, etc. Waze® sends anonymous information, including users' speed and location back to its database to improve the service as a whole. Based on the information collected, Waze® may provide routing and real-time traffic updates. Waze® servers use routing algorithms to determine the best path for a given route at that particular time.

While the Waze® app on the smartphone may have a routing algorithm, this may not be used unless there is no connection to the Waze® server. When a user requests a route calculation, the request is usually sent to the Waze® server. The Waze® server calculates the optimal route and transmits it back to the smartphone to be displayed. The user may make various routing requests, such as fastest or shortest route, whether to allow or avoid toll roads, whether to allow dirt roads, whether to avoid major highways. The shortest route may refer to the distance. The fastest route may determine that the freeway is better than country roads. The Waze® server stores information such as the average speed of roads between the user's current location and destination. The Waze® server may determine which list of roads to take to minimize the total travel time. While every request may be processed in real-time, the Waze® server may cache some requested routes or major points. In this way, the Waze® server may already know the best route from B to C and when the user asks for a route from A to C, it might just calculate the best route from A to B, once it checks that there isn't a better route bypassing B altogether.

In this example where user device 102 is a smartphone with the Waze® app and server 105 is the Waze® server, route recorder 112 and mapping component 114 may take the shortest or fastest routes generated by the Waze® server as inputs and suggest new routes that include familiar routes based on familiar routes stored in route history database 116. The familiar routes and route history may include information from previous route requests on the Waze® app that were made and travelled by the user.

Figure 2:
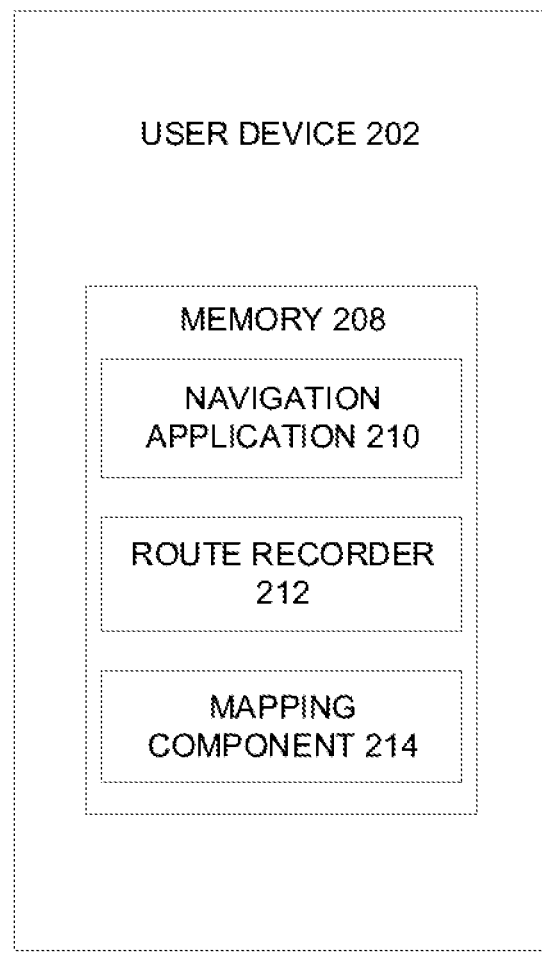
FIG. 2 is a diagram of a route mapping system, according to an example embodiment.

FIG. 2 is a diagram of a route mapping system 200, according to an example embodiment. Route mapping system 200 comprises a user device 202. User device 202 may be a network-enabled computer having a memory 208, a navigation application 210, a route recorder 212 and a mapping component 214. Route mapping system may be a personal navigation device (PND), such as Garmin® PNDs, Magellan® PNDs, Navman® PNDs, or TomTom® PNDs. Route mapping system may be an automotive navigation system that is part of the automobile controls or a third-party add-on. Route mapping system may be a truck GPS system, such as Garmin® truck GPS Navigator, TomTom Trucker GOS Navigation Device, or TruckWay GPS—Pro Series. Route mapping system 200 may provide routes for any kind of transportation, such as cars, buses, trains, trucks, mobile workers, pedestrians, bicyclists, motorcycles, sales people, product home delivery services, freight companies, shipment services, service calls, pickups and deliveries, vehicles, distributors, logistics companies, field sales, technicians, shuttles, or passenger companies.

Navigation application 110 may run on route mapping system 200 to provide one or more optimal routes in response to a request to navigate from a starting point to an ending point with optional intermediary points. Navigation application 210 may be an app installed on user device 202 or a website on a browser installed on user device 202.

Navigation application 210 may use any optimization algorithm to find the one or more optimal routes. An optimal route may be a solution to the shortest path problem, such as the shortest path between two points, A and B. Many different shortest path algorithms may be used to find an optimal route in different circumstances. Shortest path algorithms operate on a graph, which is made up of vertices and edges that connect them. For example, maps may be represented by graph data structures stored in memory and used by a navigation application. A graph may be directed, indirected, weighted, and more. These distinctions may determine which algorithm will work better than another for certain graph types.

For example, a shortest path algorithm is Dijkstra's Algorithm. Dijkstra's Algorithm stands out from the rest due to its ability to find the shortest path from one node to every other node within the same graph data structure. This means, that rather than just finding the shortest path from the starting node to another specific node, the algorithm works to find the shortest path to every single reachable node—provided the graph doesn't change. The algorithm runs until all of the reachable nodes have been visited. Therefore, you would only need to run Dijkstra's algorithm once, and save the results to be used again and again without re-running the algorithm—again, unless the graph data structure changed in any way. In the case of a change in the graph, you would need to rerun the graph to ensure you have the most updated shortest paths for your data structure. For example, if you want to go from A to B in the shortest way possible, but you know that some roads are heavily congested, blocked, undergoing works, and so on, when using Dijkstra, the algorithm will find the shortest path while avoiding any edges with larger weights, thereby finding you the shortest route.

For example, a shortest path algorithm is the Bellman-Ford Algorithm. Similar to Dijkstra's algorithm, the Bellman-Ford algorithm works to find the shortest path between a given node and all other nodes in the graph. Though it is slower than the Dijkstra's algorithm, Bellman-Ford makes up for its disadvantage with its versatility. Unlike Dijkstra's algorithm, Bellman-Ford is capable of handling graphs in which some of the edge weights are negative. If there is a negative cycle—in which the edges sum to a negative value—in the graph, then there is no shortest or cheapest path. Meaning the algorithm is prevented from being able to find the correct route since it terminates on a negative cycle. Bellman-Ford is able to detect negative cycles and report on their existence.

For example, a shortest path algorithm is the Floyd-Warshall Algorithm. The Floyd-Warshall stands out in that unlike the Dijkstra's algorithm and the Bellman-Ford algorithm, it is not a single-source algorithm. Meaning, it calculates the shortest distance between every pair of nodes in the graph, rather than only calculating from a single node. It works by breaking the main problem into smaller ones, then combines the answers to solve the main shortest path issue. Floyd-Warshall is useful when it comes to generating routes for multi-stop trips as it calculates the shortest path between all the relevant nodes. For this reason, many route planning software will utilize this algorithm as it will provide you with the most optimized route from any given location. Therefore, no matter where you currently are, Floyd-Warshall will determine the fastest way to get to any other node on the graph.

For example, a shortest path algorithm is Johnson's Algorithm. Johnson's algorithm works best with sparse graphs—one with fewer edges, as its runtime depends on the number of edges. So, the fewer edges, the faster it will generate a route. This algorithm varies from the rest as it relies on two other algorithms to determine the shortest path. First, it uses Bellman-Ford to detect negative cycles and eliminate any negative edges. Then, with this new graph, it relies on Dijkstra's algorithm to calculate the shortest paths in the original graph that was inputted.

Route recorder 212 may include any GPS tracking application. Route recorder 212 collects historical data from GPS tracking applications, vehicle or other navigation systems, and/or anything tracking location over time. For example, route recorder 212 may collect data on daily travel routes from your house to your workplace and back, travel to and from shops, restaurants, social activities or vacations, etc. For example, Route recorder 212 may gather data from the user over time and store route information that may be used by mapping component 214 to generate recommended routes that include familiar routes. Route data may be directly or indirectly collected from the user. For example, the user may manually enter routes, offer feedback on routes, or indicate preferences for certain routes. For example, data may be collected from navigation application 210, such as searches, source and destination entries, frequency of navigated or travelled routes, and the like.

Mapping component 214 may create a list of familiar routes from data recorded by route recorder 212 that are in the vicinity of the optimal routes from navigation application 210. Mapping component 214 may project one or more familiar routes onto one or more optimal routes and string together route segments to form a new route for a given source and destination. Mapping component 214 may calculate a total distance for the new route and/or a total time for the new route. Mapping component 214 may select optimization criteria such as total distance or total time and solve an optimization problem using any optimization algorithm such as the Greedy algorithm. The greedy algorithm uses the problem solving heuristic of making a locally optimal choice at each stage with the intent of finding a global optimum. Mapping component 214 may use any optimization algorithm, such as memetic algorithm, differential evolution, evolutionary algorithms, dynamic relaxation, genetic algorithms, hill climbing, Nelder-Mead simplicial heuristic, particle swarm optimization, and the like. Mapping component 214 may determine a new route based on one familiar route or a combination of multiple familiar routes integrated together.

Figure 3:
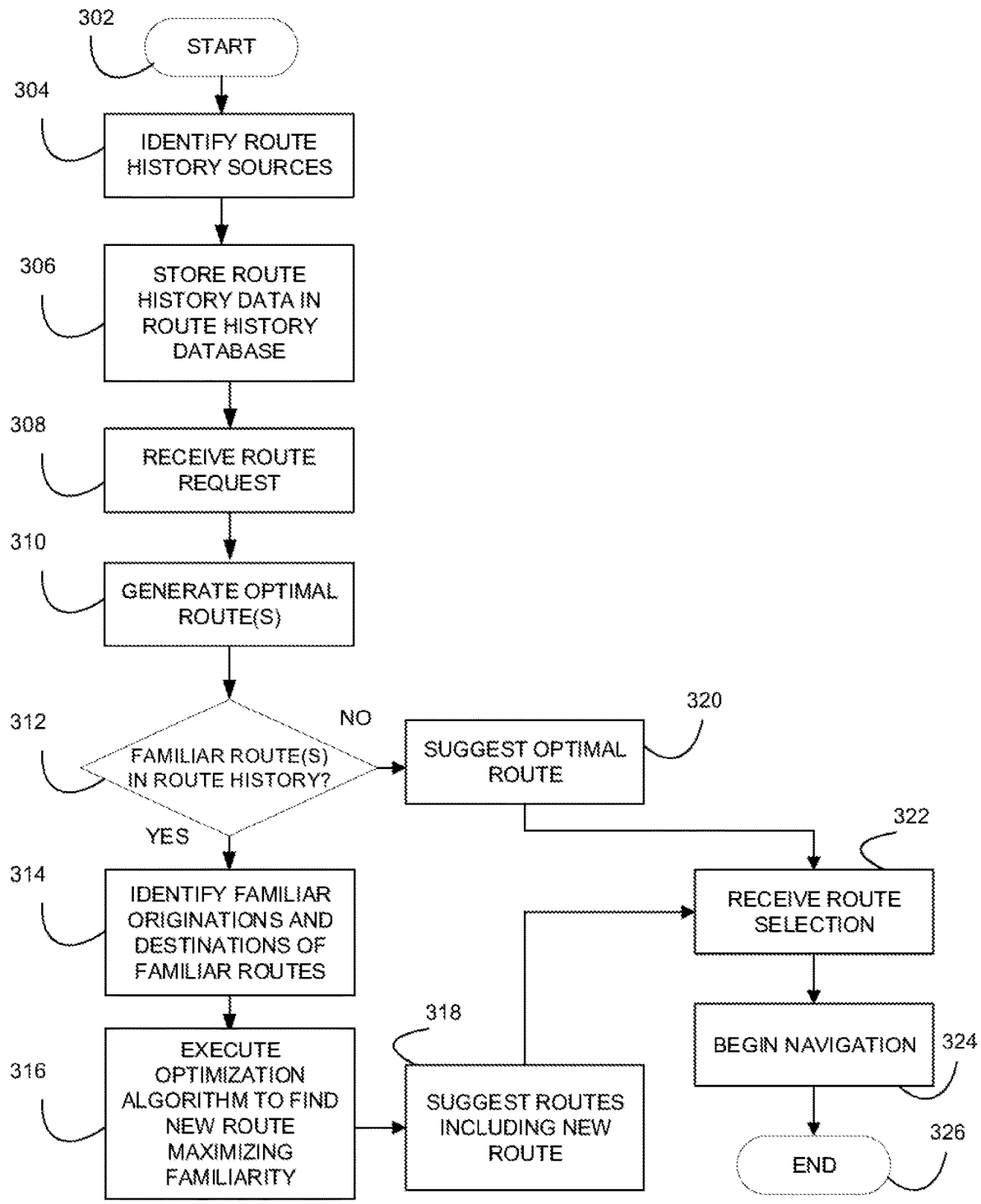
FIG. 3 is a flowchart of a route mapping method, according to an example embodiment.

FIG. 3 is a flowchart of a route mapping method 300, according to an example embodiment. Route mapping method 300 begins at 302. At block 304, route history sources are identified. Route history data may be collected from vehicle sensor data, smartphones, personal navigation devices, road sensors, connected cars, navigation systems and other sources. Route history data may be collected for automobiles, hiking, cycling, golf, aviation, buses, trains, trucks, etc. A user interface, such as an application programming interface (API) may be provided to identify route history sources. The user interface may enable a user to identify the sources and provide access, if necessary, to the information that may be retrieved and stored. For example, the user may open an app on their smartphone and configure route history source settings to allow route mapping method 300 to use information from Android Auto® or Apple Carplay® navigation systems, Apple Maps®, Google Maps®, and/or Waze®.

At block 306, route history data is stored in a route history database. Route history data may include location information, starting point, ending point, map information, user identification, speed information, frequency information, travel date, travel time, travel distance, traffic conditions, weather, and the like. Route history data may include any information available from the identified route history sources, such as previously travelled routes from Waze®. Route history data may be selected, aggregated and/or combined from multiple identified route history sources. For example, historical data may be collected over time from a user's regular travel patterns, daily routines from their house to work or weekly travel to shops or social activities. Once a sufficient amount of route history data is collected, then familiar routes may be revealed and recommendations for new routes using familiar routes may improve over time.

At block 308, a route request is received. For example, a user may connect a mobile device to their vehicle with a USB cable. The user selects navigation app on Android Auto® and selects Waze®. Then, the user says "OK Google" or selects the microphone. The user may tell Android Auto where they would like to go, such as "Take me home", "navigate to Union Square, San Francisco", "Navigate to work", and "Drive to 1600 Amphitheatre Parkway, Mountain View". Then, the user may confirm the location and follow the directions to the destination. Such a route request may include location information for the current location and destination location as well as information about the optimal route. This route request location information may be stored and used as input for route mapping method 300 to find new routes including familiar routes to suggest to the user.

At block 310, one or more optimal routes are generated. For example, an optimal route from the source to the destination may be generated by a personal navigation system to minimize time and distance. For example, in response to a route request on a Waze® app on a smartphone, a Waze® server may access navigational data and run programs to determine one or more optimal routes and send the shortest path or fastest routes results back to the user's smartphone for display. The route mapping system may receive the optimal route generated from Waze® and use the optimal routes as a starting point to find a new route including familiar routes.

At block 312, it is determined whether there are any familiar routes in the route history in the vicinity of the optimal route. For example, a route mapping system may have received the location information for the source and destination of the route request and information about the optimal route from Waze®. The route mapping system may run an optimization program on a server to determine whether there are any familiar routes stored in a route history database that are close to but not the same as the optimal route. The optimization program may include picking up familiar routes, projecting points, and minimizing gaps as will be described in more detail for two scenarios in FIG. 4. The optimization program may store the location information for the source and destination of the requested route and the information about the optimal route in data structures representing a graph so that the optimization program may operate on the graph representation made up of vertices and edges or points and line segments to find a new route using familiar routes. A familiar route near to an optimal route but not the same as the optimal route may be found in the route history using the greedy algorithm with weights to favor frequently used routes as a proxy for familiar routes. A route mapping system using familiar routes may use the greedy algorithm or any other optimization algorithm.

If a familiar route is found, at block 314 the familiar originations and familiar destination of familiar routes are identified. For example, a single familiar route may cover most of the distance between the given source and destination but the origination and destination of the familiar route might need to be linked up to the given source and destination to provide a complete new route. For example, a route mapping system using familiar routes may find a suitable familiar route in the route history database, including the location information for the origin and destination of that familiar route. The route mapping system may find that familiar route by running a mapping component on a server.

At block 316, an optimization algorithm is executed to find a new route that maximizes familiarity. For example, a route mapping system may include a server running a mapping component that includes an optimization program for finding new routes using familiar routes. The optimization program may use a greedy algorithm. The greedy algorithm may be used with optimization criteria selected to maximize familiarity. For example, the frequency that a route has been travelled may be used as a proxy for familiarity. For example, a new route may include familiar routes so long as they are not too far out of the way and do not waste too much time. For example, a new route may include a number of familiar routes chained together, but not too many chained together, especially if the new route ends up being too complicated or taking too long to find. The mapping component may take such considerations into account by calculating a threshold for deciding when a new route using familiar routes would be a good idea.

At block 318, the optimal routes and new routes are suggested to the user. For example, the optimal routes determined by a personal navigation system may be displayed along with a new route that includes familiar paths and is not too far out of the way and doesn't take too much extra time.

At block 320, if no familiar routes in the route history were suitable, only the optimal route or routes are suggested to the user. At block, 322, the user selects one of the suggested routes and, at block 324, the user begins navigation of the selected route. The route mapping method ends at 326.

FIG. 4 is a map 400, according to an example embodiment. Map 400 shows routes from point A to point B. Map 400 illustrates how a route mapping method might construct new routes using familiar routes for some examples. Map 400 shows three possible optimal routes from point A to point B indicated by line segments labeled green on the graph, in this example. Map 400 shows top, middle and bottom green optimal routes going from left to right across the graph. For example, the user may have entered the location of point A as the source and the location of point B as the destination into a personal navigation system, which generated three optimal routes from A to B. A route mapping method may generate, for example, three familiar routes indicated by blue and red line segments A'B' (blue), $A_1I_1$ (red) and $J_1B_1$ (red). For example, the route mapping method may have searched the route history for familiar routes close to the green optimal routes and found a single blue familiar route going most of the way from A to B and two red familiar routes that may be combined to go most of the way from A to B. In a first example, a simple new route indicated by line segment AA'B'B may be generated by the route mapping method. In a second example, a combination new route $AA_1I_1I_2J_2J_1B_1B$ may be generated by the route mapping method.

In a first example shown on map 400, a simple new route indicated by line segment AA'B'B may be generated by the route mapping method. The simple new route AA'B'B begins with point A, the origination selection and end with point B, the destination selection. The simple new route includes blue line segment A'B', a familiar route segment. The familiar route, indicated by blue line segment A'B', is linked up to the origination selection A and the destination selection B by adding dashed line segment AA', the origination route, and dashed line segment B'B, the destination route.

In a second example shown on map 400, a combination new route $AA_1I_1I_2J_2J_1B_1B$ may be generated by the route mapping method. The combination route $AA_1I_1I_2J_2J_1B_1B$ begins with point A and ends with point B and includes two familiar routes indicated by red line segments on the graph in the lower left part of the graph and from the middle of the graph to the upper right part of the graph. The combination route $AA_1I_1I_2J_2J_1B_1B$ includes red line segment $A_1I_1$, indicating the first familiar route, and red line segment $J_1B_1$, indicating the second familiar route. The first ($A_1I_1$) and second ($J_1B_1$) familiar routes in red are connected up to form new route $AA_1I_1I_2J_2J_1B_1B$ using three connector routes that bridge the gaps. These three connector routes connect the two familiar routes to a portion of one of the green optimal routes to form new route $AA_1I_1I_2J_2J_1B_1B$. The first connector route $I_1I_2$ is shown as a dashed line on the graph and connects the first familiar route $A_1I_1$ (red) to line segment $I_2J_2$ (green) of the optimal route that is the lowest or furthest down on the graph. The second connector route $I_2J_2$ (green) connects the first familiar route $A_1I_1$ (red) to the third connector route $J_2J_1$ (dashed). The third connector route $J_2J_1$ (dashed) connects line segment $I_2J_2$ (green) of the optimal route to second familiar route segment $J_1B_1$ (red). In this way, a sequence is created combining the two familiar routes with a portion of the optimal route. Then, the beginning and end of this sequence of the two familiar routes and a portion of the optimal route is linked up to the origination selection A and the destination selection B by adding dashed line segment $AA_1$, the modified origination route, and dashed line segment $B_1B$, the modified destination route.

Map 400 illustrates how a route mapping method may find new routes using familiar routes close to optimal routes. In the first example, a simple new route included one familiar route that went almost the whole way from A to B and added segments at the start and end. In the second example, two familiar routes were combined with a portion of one optimal route and segments were added at the start and end to form a combination new route.

The route mapping method may solve an optimization problem where familiar routes are projected onto the optimal routes and combined in a way to minimize the gap between the familiar routes and the optimal routes. For example, if you plan for a trip which takes three hours, then the route mapping method may allow the gap to be within a half hour or so. So long as the total combined familiar route using, for example, the greedy algorithm, is within the allowed gap compared to the optimal route, then the route mapping method would suggest the total combined familiar route. The route mapping method may solve an optimization problem and minimize the gap within a threshold of time and/or distance to determine a recommended route. The optimal routes shown in green on map 400 may be routes from a navigational system, such as Google Maps® or Apple Maps® and the suggested route would be taking into account the user's comfort level by incorporating familiar routes from a route history.

The route mapping method may project familiar routes onto the optimal routes and then solve an optimization problem. The projected points are determined as part of the route mapping method. For example, projected points on map 400 are A', B', $A_1$, $I_1$, $I_2$, $J_2$, $J_1$, and $B_1$. The route mapping method may select the best position to project the familiar route to the optimal route. In other words, the familiar routes are projected against the optimal route and any gaps are minimized.

The route mapping method may use some optimization algorithm to project points on map 400. For example, the route mapping method may project source A to A' and then use the familiar route from A' to B'(blue) and find the optimal point to project B' back to the destination B. In this case, the simple new route goes from A to A' and A' to B' and B' to B.

The route mapping method may combine short familiar routes such as the red segments on map 400. In this case, the route mapping method may find more projected points to string or connect them all together to form a new route to suggest to the user. The route mapping method may project A to $A_1$ and then use the red familiar route from $A_1$ to $I_1$.

Then $I_1$ is projected back to $I_2$ and tied up to part of the green optimal route $I_2$ to $J_2$. Then, from $J_2$, the best point to project back to the familiar route is $J_1$. Then, the familiar route from $J_1$ to $B_1$ is used. Point $B_1$ is projected back to destination B.

The new routes are known comfortable routes for the user but they may not go directly to the source and destination. The user may be willing to make a little concession in terms of distance to travel the more comfortable route provided that it is not too big of a concession in terms of time, distance, complexity or other concerns. The route mapping method takes this into account by using a threshold for suggesting new routes using familiar routes. The threshold may strike a balance between an optimal route and comfortable or familiar routes. The threshold may be determined by a range deviation from the fastest route. For instance, the range derivation from the fastest route may be set as not exceeding 50% increase in time-to-destination versus the determined fastest route.

The route mapping method may calculate the total distance and/or the total time or other metrics for a potential suggested new route to determine whether the threshold is met.

Comfortability may be approximated using weights in an objective function where the weights represent the frequency of the familiar routes in the history. For example, the route mapping method may minimize the gap between a new route and an optimal route using two terms in the objective function. The first term may be the total amount of time for the new route and the second term may be the comfortability or weights.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "some examples," "other examples," "one example," "an example," "various examples," "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrases "in one example," "in one embodiment," or "in one implementation" does not necessarily refer to the same example, embodiment, or implementation, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A non-transitory computer-accessible medium having stored thereon computer-executable instructions, wherein, when a computer arrangement executes the instructions, the computer arrangement is configured to perform procedures comprising:
   generating an optimal route from an origination to a destination;
   selecting a familiar route from route history data based on the optimal route, the familiar route having a familiar origination and a familiar destination;
   generating an origination route from the familiar origination to the origination;
   generating a destination route from the familiar destination to the destination;
   generating a new route from the origination to the destination, the new route comprising the origination route, the familiar route, and the destination route;
   generating comparison information between the new route and the optimal route, the comparison information including:
      a comparison of an estimated travel time for the optimal route and an estimated travel time for the new route, and
      a notification if the estimated travel time for the new route exceeds the estimated travel time for the optimal route by a predetermined threshold; and
   communicating for display on a user device associated with a user, the optimal route, the new route, and the comparison information.

2. The non-transitory computer-accessible medium of claim 1, wherein:
   the route history data includes origin information, destination information, and location information regarding one or more routes taken by the user, and
   the procedures comprise collecting route history data associated with the user and storing the collected route history data in a route history database.

3. The non-transitory computer-accessible medium of claim 2, wherein the route history data is collected for one or more modes of transportation, the one or more modes of transportation including at least one selected from the group of an automobile, a bus, and a train.

4. The non-transitory computer-accessible medium of claim 2, wherein the route history data is collected for one or more activities, the one or more activities including at least one selected from the group of hiking and cycling.

5. The non-transitory computer-accessible medium of claim 4, further comprising:
   generating a modified origination route and a modified destination route,
   wherein the modified origination route connects the origination to the first familiar route and the modified destination route connects the second familiar route to the destination, and
   wherein the new route includes the modified origination route and the modified destination route.

6. The non-transitory computer-accessible medium of claim 2, wherein the route history data comprises at least one travel pattern selected from the group of a daily travel routine and a weekly travel routine.

7. The non-transitory computer-accessible medium of claim 1, wherein:
   the familiar route comprises a first familiar route and a second familiar route, and the procedures comprise:
      generating a first connector route, a second connector route, and a third connector route,
   wherein the first connector route connects the first familiar route to the second connector route, the second connector route connects the first connector route to the third connector route, and the third connector route connects the second connector route to the second familiar route, and
   wherein the new route comprises the first familiar route to the first connector route to the second connector route to the third connector route to the second familiar route.

8. The non-transitory computer-accessible medium of claim 7, wherein the comparison information includes a notification if an estimated travel distance for the new route exceeds an estimated travel distance for the optimal route by a predetermined threshold.

9. A route mapping system, comprising:
   a route mapping device comprising a processor in data communication with a memory, wherein the processor is configured to:
      generate an optimal route from an origination to a destination,
      select a familiar route from route history data based on the optimal route, the familiar route having a familiar origination and a familiar destination,
      generate an origination route from the familiar origination to the origination,
      generate a destination route from the familiar destination to the destination,
      generate a new route from the origination to the destination, the new route comprising the origination route, the familiar route, and the destination route,
      generate comparison information between the new route and the optimal route, the comparison information including:
         a comparison of an estimated travel time for the optimal route and an estimated travel time for the new route, and
         a notification if the estimated travel time for the new route exceeds the estimated travel time for the optimal route by a predetermined threshold, and
      communicate, for display on a user device associated with a user, the optimal route, the new route, and the comparison information.

10. The route mapping system of claim 9, wherein:
    the route mapping device comprises a server in data communication with a route recorder, and
    the route recorder is configured to collect route history data, wherein the route history data includes origin information, destination information, and location information regarding one or more routes taken by the user; and store the route history data in a route history database.

11. The route mapping system of claim 10, wherein the route recorder is configured to:
   store location information and time information at a number of points along one or more routes in the route history data; and
   generate a weight for one or more routes in the route history data, the weight representing a travel cost derived from location information and time information,
   wherein the mapping component is further configured to minimize the travel cost.

12. The route mapping system of claim 10, wherein the route recorder is stored in a memory of a user device in data communication with the server and a Global Positing System (GPS) tracking system.

13. The route mapping system of claim 9, wherein the predetermined threshold is a less than 50% increase in estimated travel time for the new route versus the estimated travel time for the optimal route.

14. The route mapping system of claim 9, wherein the predetermined threshold is received as an input from a user.

15. A route mapping method, comprising:
   generating an optimal route from an origination to a destination;
   selecting a familiar route from route history data based on the optimal route, the familiar route having a familiar origination and a familiar destination;
   generating an origination route from the familiar origination to the origination;
   generating a destination route from the familiar destination to the destination;
   generating a new route from the origination to the destination, the new route comprising the origination route, the familiar route, and the destination route;
   generating comparison information between the new route and the optimal route, the comparison information including:
      a comparison of an estimated travel time for the optimal route and an estimated travel time for the new route, and
      a notification if the estimated travel time for the new route exceeds the estimated travel time for the optimal route by a predetermined threshold; and
   communicating for display on a user device associated with the user, the optimal route, the new route, and the comparison information.

16. The route mapping method of claim 15, wherein the instructions comprise the steps of:
   collecting route history data, the route history data including origin information, destination information, and location information regarding one or more routes taken by a user; and
   storing the route history data in a route history database.

17. The route mapping method of claim 16, wherein the route history data is collected for one or more modes of transportation, the one or more modes of transportation including at least one selected from the group of an automobile, a bus, and a train.

18. The route mapping method of claim 16, wherein the route history data is collected for one or more activities, the one or more activities including at least one selected from the group of hiking and cycling.

19. The route mapping method of claim 15, further comprising:
   generating a weight for the familiar route,
   wherein the weight represents a frequency of the familiar route in the route history data.

20. The route mapping method of claim 19, wherein the familiar route is selected based on proximity to the optimal route.

* * * * *